July 24, 1962 E. E. HOWE 3,045,736
PILOT WELD NUT AND METHOD OF MAKING THE SAME
Original Filed April 23, 1949 3 Sheets-Sheet 1
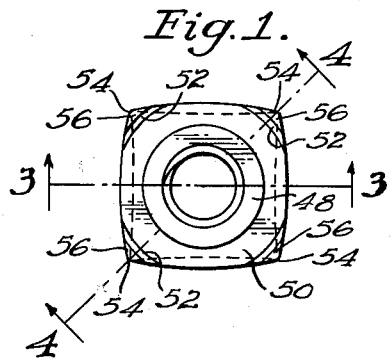
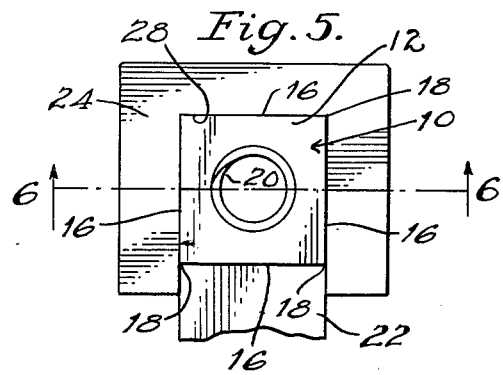
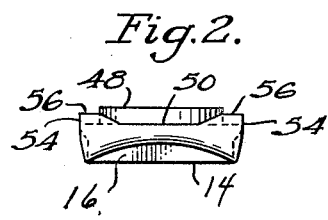
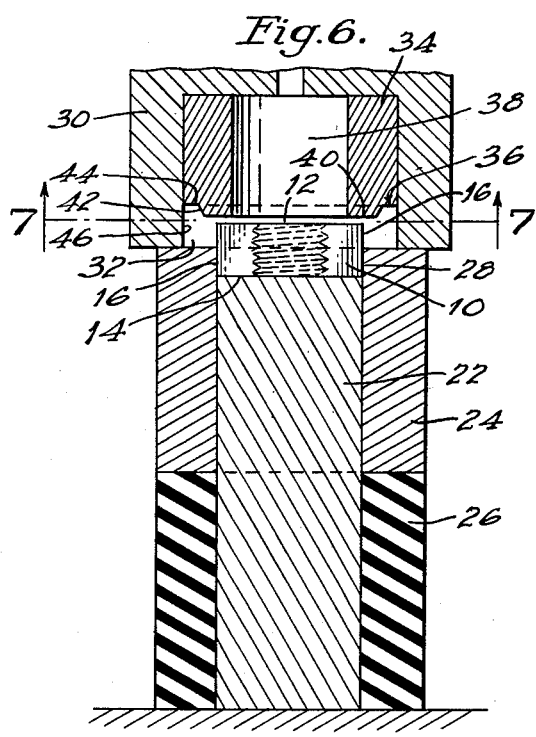
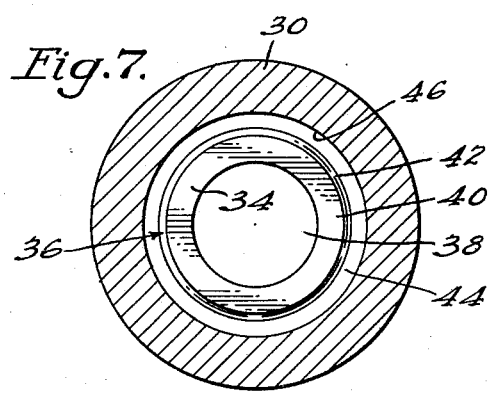
INVENTOR.
Earl E. Howe.
BY
Balluff and McKinley
ATTORNEYS.

July 24, 1962 E. E. HOWE 3,045,736
PILOT WELD NUT AND METHOD OF MAKING SAME
Original Filed April 23, 1949 3 Sheets-Sheet 2
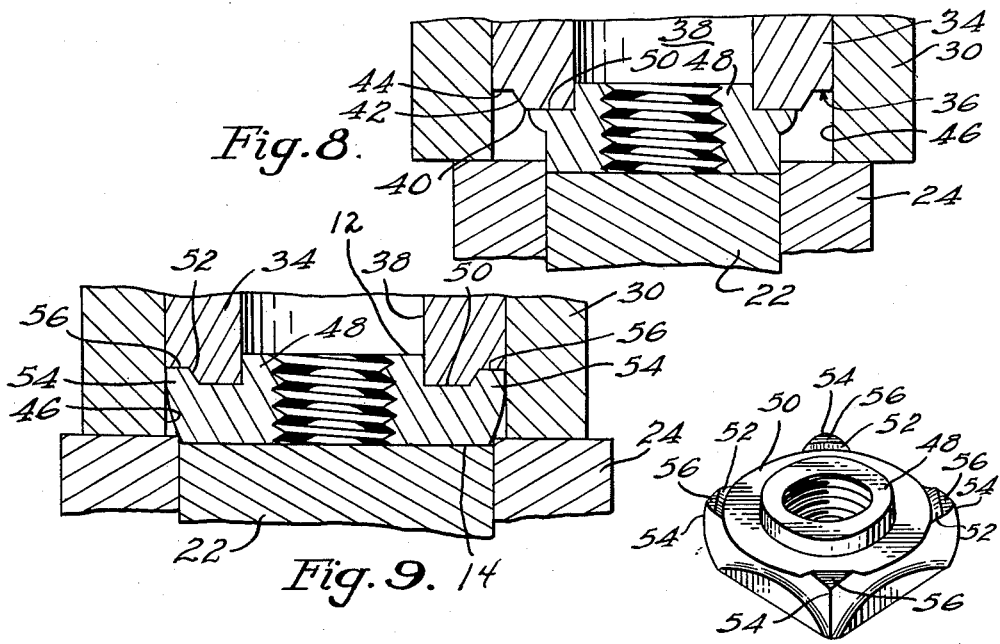
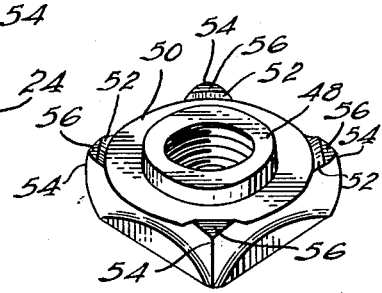
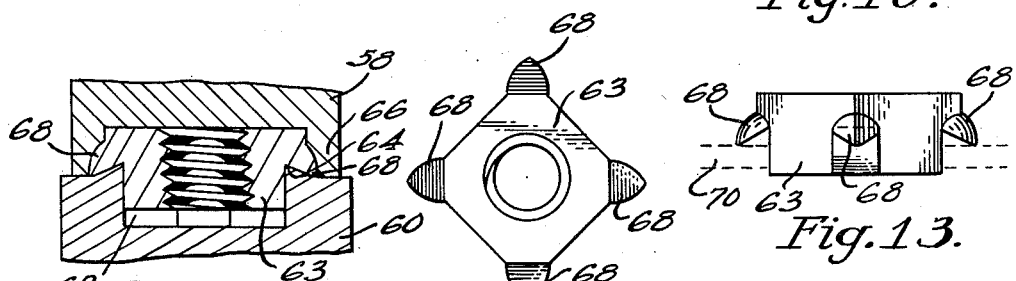
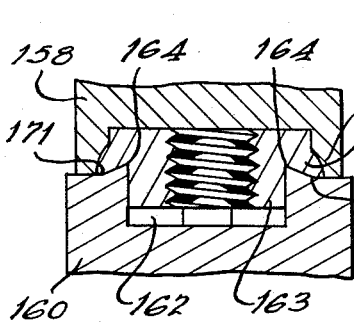 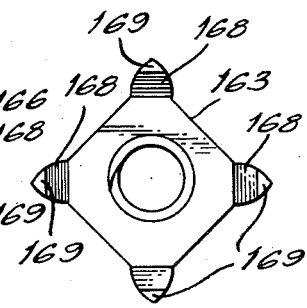 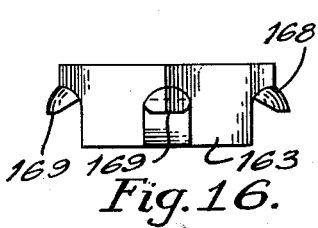
INVENTOR.
Earl E. Howe.
BY
Balluff and McKinley
ATTORNEYS.

July 24, 1962 E. E. HOWE 3,045,736
PILOT WELD NUT AND METHOD OF MAKING THE SAME
Original Filed April 23, 1949 3 Sheets-Sheet 3
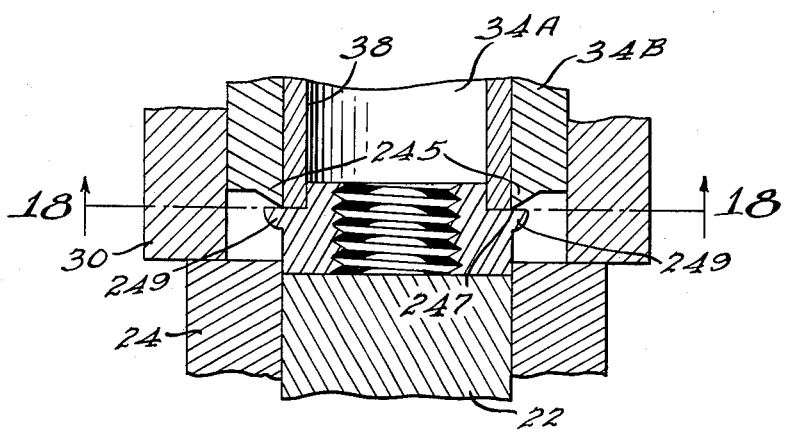
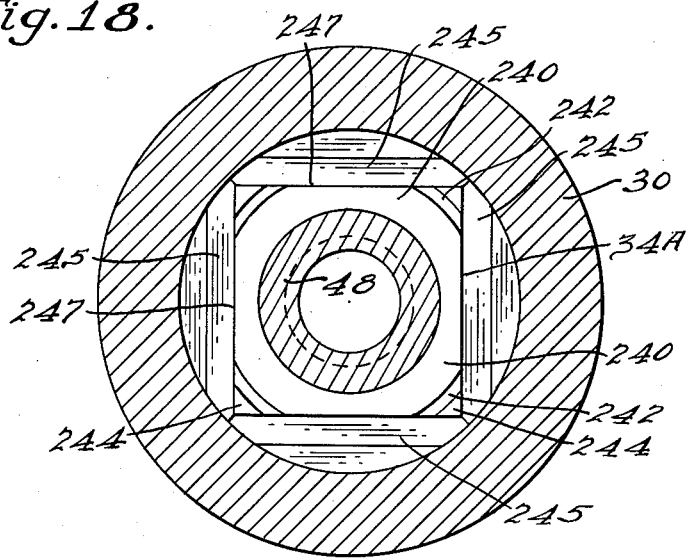
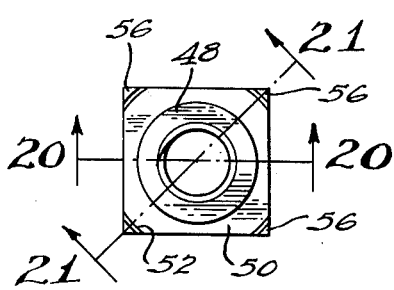
INVENTOR.
Earl E. Howe.
BY
Balluff and McKinley
ATTORNEYS.

3,045,736
PILOT WELD NUT AND METHOD OF MAKING THE SAME
Earl E. Howe, Chicago, Ill.
Continuation of application Ser. No. 89,190, Apr. 23, 1949. This application June 23, 1958, Ser. No. 743,674
15 Claims. (Cl. 151—41.7)

This is a continuation of applications Serial No. 89,190, filed April 23, 1949, which is a continuation-in-part of Serial No. 560,984, filed October 30, 1944, both now abandoned, and Serial No. 420,863, filed April 5, 1954, now abandoned.

My invention resides in the field of weld elements or connecting elements of the weld nut type, and in a method which can be applied equally well to either nuts or boltheads as desired.

A primary object of my invention is to provide a new and improved method of making uniform discrete weld elements of the pilot type, wherein the resulting element has a pilot or guiding portion for socketing the element into an opening, and the weld element may be made from a discrete blank such as a standard nut by a single application of pressure or a single pressure stroke.

Another object of my invention is to provide a new and improved method of making a pilot weld element in such a manner that the final dimensions of the element are accurately determined.

Another object of my invention is to provide a method of making a pilot nut so that welding projections are formed around the pilot and setback or below the top surface of the pilot a predetermined distance and accurately positioned relative to an undistorted reference surface of the blank from which it is made.

Another object of my invention is to provide a method of making a pilot weld nut of the above type in which the welding projections have their points slightly blunted and positioned in a plane normal to the axis of the weld nut.

Another object of my invention is to provide a method of making a pilot nut of the above type in which one surface of the nut will be substantially unmarred and unaffected by a single pressure operation so that the resulting nut will not fuse to its electrode during a subsequent welding operation.

Another object of my invention is to provide a pilot weld nut formed by the above method.

Other objects will appear from time to time in the ensuing specification and drawings in which:

FIGURE 1 is a plan view of a new and improved pilot weld nut resulting from my method;

FIGURE 2 is a side view of the pilot nut shown in FIGURE 1;

FIGURE 3 is a sectional view taken along line 3—3 of FIGURE 1;

FIGURE 4 is a sectional view taken along line 4—4 of FIGURE 1;

FIGURE 5 is a plan view of a standard nut positioned in the dies preparatory to the pressure operation;

FIGURE 6 is a sectional view taken along lines 6—6 of FIGURE 5;

FIGURE 7 is a sectional view taken along lines 7—7 of FIGURE 6;

FIGURE 8 is a sectional view similar to FIGURE 6 but on an enlarged scale showing the die mechanism engaging a standard nut at the end of a die pressure operation;

FIGURE 9 is a sectional view similar to FIGURE 8 taken diagonally across the corners of the nut and the die mechanism;

FIGURE 10 is a perspective view of the nut in FIGURES 1 through 9;

FIGURE 11 is a modified form of the pilot nut showing slightly modified die mechanisms;

FIGURE 12 is a plan view of the nut formed in FIGURE 11;

FIGURE 13 is a side view of the nut in FIGURE 12 showing its initial relation with a perforated piece of metal (diagrammatically illustrated) to which it is to be welded;

FIGURE 14 is a view similar to FIGURE 11 and showing a method of making a pilot nut as in FIGURE 12 but with blunted tips on the welding projections;

FIGURE 15 is a plan view of the pilot nut formed by the method illustrated in FIGURE 14;

FIGURE 16 is a side elevational view of the nut shown in FIGURE 15;

FIGURE 17 is a sectional view, similar to FIGURE 8, showing a modified die mechanism and method;

FIGURE 18 is a horizontal section taken along the line 18—18 of FIGURE 17;

FIGURE 19 is a plan view of a modified form of pilot weld nut formed by the method illustrated in FIGURES 17 and 18;

FIGURE 20 is a sectional view taken along the line 20—20 of FIGURE 19; and

FIGURE 21 is a sectional view taken along the line 21—21 of FIGURE 19.

In FIGURE 5 I have shown a blank such as a standard nut, indicated generally at 10, positioned in a reciprocating die mechanism. Such a blank has generally flat, parallel, square end surfaces 12 and 14 of equal area, intersecting generally flat side surfaces 16 in lateral edges, corners 18, and a centrally disposed threaded bore 20, the axis of which is generally normal to the surfaces 12 and 14. A nut blank of this type, of course, is conventional and readily obtainable in gross lots on the open market relatively cheaply.

A discrete nut blank, such as shown in FIGURES 5 and 6, is positioned by itself in a pressure or working zone or station between the opposed dies of a reciprocating press, the lower die of which including a post-like element 22 firmly resting on any suitable supporting structure or frame. The post is surrounded on three sides by a U-shaped pad element 24 supported on a resilient rubber unit 26 so that the pad can easily be moved up and down. Normally the upper surface of the pad extends slightly above the upper surface of the post, as shown in FIGURE 6, forming a three-sided pocket 28 open on one side, as shown in FIGURE 5, for accurately positioning the nut blank preparatory to the formation of the weld nut. Thus the nut blank can be fed along the surface of the post into the three-sided pocket and will be accurately positioned therein by the pad. Of course, the dies may be opened wider than I have shown in FIGURE 6 to facilitate insertion of the nut blanks, and multiple dies can be used so as to form a plurality of pilot weld nuts on each stroke of the press.

The upper die includes a cage element 30 surrounding the pocket and having a generally open cylindrical bore 32 of a greater diameter than the width of the pocket. Disposed and removably held within the bore by any suitable means is a replaceable punch element 34 having a work engaging face 36 of a special configuration positioned over the pocket and engageable with a nut blank positioned therein during closing of the press.

The punch element has an open passage 38. The work engaging face 36 includes an annular flat surface 40 surrounding the passage 38. Surrounding the surface 40 and concentric with it is a frusto-conical surface 42. Surrounding this surface and concentric therewith is annular flat surface 44 which extends to the outer edge of the punch element.

In FIGURES 8 and 9 I have shown the nut after it has been formed by the die mechanism with the punch element still in engagement with it. Any suitable drive mechanism can be provided to force the upper die down into engagement with the nut blank to form the resulting pilot nut. During its initial downward movement the cage 30 engages the pad 24 and depresses the rubber element 26, the relative positions being best shown in FIGURE 6. Before the upper edge of the pad passes below the upper surface of the post the annular die surface 40 of the punch 34 engages the upper end surface 12 of the nut blank inwardly of the corners 18. As the upper die progressively moves downwardly in a single unitary movement the conical surface 42 next engages the blank inwardly of the corner portions and works the metal of the blank and finally the outer annular surface 44 engages the metal of the blank at the corners and cooperates with the surface 42 to form the projections 54. The downwardly moving punch element 34 displaces and deforms the metal of the blank at one end thereof outwardly of the pilot 48 both axially and laterally outwardly. The post 22 supports the lower end surface of the blank so that the metal at such end is not deformed. Thus the displaced metal must flow laterally.

To prevent the nut blank from substantially losing its original dimensions, the cage has a cylindrical inner confining surface or wall 46 which opposes and limits the lateral flow at the corners, as shown in FIGURE 9.

The metal at the center of the nut blank around the threaded bore is generally unopposed and free from metal deforming pressure and from displacement and forms a circular pilot 48, being accommodated in the passage 38 of the punch. The shape of the pilot 48 will, of course, conform to the shape of passage 38, and if desired the cross section of passage 38 may be square or hexagonal, or otherwise to form a correspondingly shaped pilot. The inner annular surface 40 of the punch's work engaging face forms an annular, generally flat, depressed area 50 on the nut which surrounds the pilot. The outer edge of this annular area overlaps the lateral edges of the nut slightly as shown in FIGURES 1 and 10.

The conical surface 42 of the punch only contacts the blank across and inwardly of the corners 18 to form disconnected conical surfaces 52 faced generally toward the pilot.

The corners are formed by the cooperation of surfaces 42 and 44 into uniform projections 54 of equal height which project outwardly slightly as shown in FIGURES 4 and 9 and are blunted at 56 so that the projection formed at each corner has a flat, blunt engaging end or surface, and so that the blunted ends 56 of all of the projections 54 all lie in a plane normal to the axis of the nut.

The axial distance between the annular surfaces 40 and 44 on the punch is imparted to the nut blank. Therefore the axial distance between the annular zone or area 50 and the general plane of the blunt projections 56 is generally this same axial distance. In effect, the annular area 44 lowers each of the projections 54 below the top surface of the pilot 48 a predetermined distance as shown in FIGURES 4 and 9.

In FIGURES 11 through 13 I have shown a modified form of the pilot nut in which a blank such as a standard square nut is confined between opposed dies 58 and 60, the lower die having a square bore 62 to form a pilot portion 63 and the upper die having a pocket to receive the body of the blank. The lower die has raised cutting edges 64 which simultaneously cut across one end surface inwardly of all of the corners of the blank deforming the corner material thereof both axially and laterally as shown in FIGURES 12 and 13 to form uniform welding projections 68 of equal height. A confining wall 66 on the upper die prohibits substantial lateral deformation, and the dies engage each other after projections 68 have been forced away from or beyond the sides of the pilot 63 due to penetration of the cutting edges 64 into the body of the blank a predetermined distance. FIGURE 13 shows the initial relation of the pilot weld nut of FIGURE 12 to an apertured piece of metal diagrammatically illustrated at 70 to which the nut is to be welded, with the pilot 63 projecting through the aperture in the metal 70 and with the tips of the welding projections 68 all contacting one surface of the piece 70.

In FIGURES 12 and 13 it can be seen that the pilot is substantially square rather than round like the pilot in the species of FIGURES 1 through 10. The nut in FIGURES 11 and 13 could be formed to have a round pilot, but a square pilot is desirable in certain circumstances.

The use, operation and function of my invention are as follows:

My invention is broadly a method of forming a pilot weld nut per se so that the resulting nut will have: predetermined outside or lateral dimensions, a pilot formed in the body of the nut, uniform projections of equal height at each of the corners disposed around the pilot and projecting in the same direction as the pilot, the common plane of the projections being axially spaced from the upper surface of the pilot and blunted points on the projections to effect accurate welding. It is very desirable to make a pilot weld nut of the above type from a blank such as a standard or conventional nut which can be purchased in large quantities on the open market at favorable prices. A method that uniformly produces an accurate special design of nut from a standard nut blank is highly desirable because special forged strips of metal or rolled sections will not be required. All a weld nut manufacturer has to do is to buy standard nuts and deform them according to the above method, and an efficient and accurate pilot weld nut is produced.

Referring first to the species of FIGURES 1–10, the three work engaging surfaces on the punch are very important. The inner annular surface 40 in effect forms the pilot by depressing and deforming axially the metal that surrounds the pilot but without deforming the metal of the pilot 48 or the threaded bore. The frusto-conical work engagement surface 42 deforms the corner portions both axially and laterally and works the metal into welding points or projections between it and the surrounding wall of the cage. The outer annular surface 44 on the punch blunts the points or projections and displaces them into a plane a predetermined distance below the upper surface of the pilot, which is the original end surface of the nut.

The confining wall 46 of the cage 30 confines the metal at the corners of the nut body and prevents it from flowing too far laterally so that the resulting pilot weld nut can still be used in conventional hopper feeding equipment even though slightly deformed laterally. It should be understood that the confining wall can be adjusted as desired in size or made with any suitable dimension to determine accurately the outside dimensions of the resulting pilot nut, for example as shown in FIGS. 17 to 21 hereof.

It is very desirable that the welding projections be blunted to accurately form and position such projections so that when the weld nut is positioned against a plate with an electrode placed against the surface 14, the nut will not rock, and all four blunt surfaces on the projections will firmly engage the metal plate and current will flow evenly through each projection and will fuse it solidly to the plate. If one point is higher than the other, all of the current will flow through the uneven point and an uneven, poor quality connection will result with intense sparking.

The post supporting the lower surface of the standard nut blank does not mar it in any way. It can be seen in FIGURES 2 through 4 and in FIGURE 13 that one surface of the pilot nut is substantially unchanged. This is the surface against which the electrode is applied and the nut will not have a tendency to fuse to the electrode at any time.

The same is true of the pilot nut in FIGURES 11–13; while I have shown it as having substantially sharp points, it should be understood that these could be blunted by suitable die formation much the same as in FIGURES 1 through 9. Thus, in FIGURES 14, 15 and 16 I show a modified form of the weld nut shown in FIGURE 12 with welding projections 168 having blunted tips 169, and a method of making the same.

In making the pilot nut of FIGURES 15 and 16 a standard nut blank is confined between two opposed dies 158 and 160, the lower die having a square bore 162 to form a pilot 163, and the upper die having a pocket to receive the body of the blank. The lower die has raised cutting edges 164 which cut across one end surface of the blank inwardly of the corners of the blank, deforming the corner material both axially and laterally as shown. A confining wall 166 on the upper die prohibits substantial lateral deformation, and the dies engage each other after the projections 168 have been forced away from the pilot 163 due to the penetration of the cutting edges 164 into the body of the blank a predetermined distance. The lower die 160 is formed outwardly of each cutting edge 164 with flat surfaces 171 which engage the tips of the projections 168 and blunt the same, thereby forming flat contact areas 169 at the tips of the welding projections 168, such areas 169 being in a common plane which is normal to the axis of the nut so that all four blunt surfaces 169 will firmly engage the metal plate to which the nut is to be welded.

If the resulting nut has a tendency to stick or hang in the punch, a suitable knockout could, of course, be easily provided.

In FIGURES 17 to 21 there are illustrated a modified apparatus and method for forming a pilot weld nut like FIGURE 1 but in which the overall dimensions of the pilot nut are the same as those of the standard blank from which the pilot weld nut is made. Thus, the pilot weld nut as shown in FIGURES 19, 20 and 21 is essentially the same as that disclosed in FIGURES 1 to 4 and 10 and is formed by the same method, except that the lateral dimensions of the finished nut as shown in FIGURES 19, 20 and 21 are the same as the blank from which the pilot weld nut is made.

The method and apparatus of FIGURES 17 and 18 essentially involve, in addition to the steps involved in forming the nut of FIGURE 1, the performance of an additional step so as to trim or shear from the weld nut as shown in FIGURE 1 the displaced metal of the blank which overhangs the sides of the original blank illustrated in dotted line in FIGURE 1. Thus, in FIGURES 17 and 18, where the parts of the apparatus are the same as those used in the forming of the nut shown in FIGURE 1, the same reference characters are employed and hence there is no necessity for repeating here the method and apparatus previously described for forming the weld nut shown in FIGURES 1–4 and 10.

In the case of FIGURE 17, the punch comprises two parts, namely the punch element 34A and the punch element 34B. The punch element 34A in all significant respects is the same in construction and function as the punch element 34, and will in the apparatus as illustrated in FIGURE 17 form a pilot weld element essentially as illustrated in FIGURE 1. In other words, the pilot weld nut illustrated in the apparatus in FIGURE 17 corresponds in all significant respects with the pilot weld nut shown in FIGURES 1–4 and 10.

The punch element 34A is disposed within the punch element 34B and has surfaces 240, 242 and 244 corresponding essentially with surfaces 40, 42 and 44 of punch element 34, except for the omission of portions of the annular surface 240 which, if provided, would overhang the nut blank. In other words, the lateral dimensions of the surface 240 do not exceed the lateral dimensions of the nut blank. The punch 34A is also provided with a passage 38 like the punch 34 for accommodating the pilot 48 during the formation of the weld nut.

The punch element 34B comprises a plurality of shearing or trimming tools 245, each of which is provided with a cutting or trimming edge 247. The cutting edges of the shearing or trimming tool portion of punch element 34B are adapted after the formation of the pilot weld nut as shown in FIGURE 1 to trim or shear from the nut body the outwardly laterally displaced metal which overhangs the original sides of the nut blank, and for this purpose the punch element 34B after it moves downwardly with the punch element 34A to the position shown in FIGURE 17 is movable downwardly relatively to the punch 34A so as to trim the excess metal above referred to, indicated at 249 in FIGURE 17, thereby finishing the pilot weld nut to the size and shape as illustrated in FIGURES 19, 20 and 21. Suitable provision (not shown) is made for the removal of the trimmed portions from the die, such as by the use of an air blast.

It should be noted in all of the embodiments shown that the welding projections, including the tips thereof, not only are accurately formed during the formation of the pilot weld nut, but also are uniformly and accurately positioned with reference to the threaded bore of the nut so that the finished pilot weld nut is accurately made. Thus the process disclosed and claimed permits the economical manufacture of uniform, accurately made pilot weld nuts from blanks such as standard nuts, although the process is not limited to the use of standard nuts as blanks. The process normally produces an accurately made pilot weld nut in which the welding projections are formed and accurately located during their formation with respect to an undistorted reference surface of the blank from which the nut is made.

While I have shown and described the preferred forms of my invention, it should be understood that numerous alterations, substitutions, changes and modifications can be made without departing from the fundamental theme of the invention, and I therefore wish that my invention be unrestricted except as by the appended claims.

I claim:

1. A discrete weld nut formed from flat square stock having corner portions partly sheared from the remainder of the stock downwardly from one side thereof, the sheared corner portions being spaced apart to provide portions of the original edges of the nut intact, the sheared corner portions being formed downwardly below the said one side of the nut, and each having the upper surface thereof inclined upwardly and outwardly to leave the original corners of the nut at a higher elevation than the remainder of the upper surface of the corner portions so as to form uniform welding projections at the outer corners of the nut.

2. The structure of claim 1 in which the sheared corner portions are straight.

3. The structure of claim 1 in which the welding projections formed at the corner portions have sharp points.

4. A discrete weld nut formed from generally flat square stock with a threaded bore and having portions sheared from the remainder of the stock downwardly from one side thereof while leaving such remainder to form a pilot and said side at its original elevation, said portions including the corners, the sheared portions at the corners being formed downwardly and disposed around said pilot below the said one side of the nut, and having the upper surfaces thereof inclined upwardly and outwardly to leave the ends of the sheared portions at the corners of the nut at a higher elevation than the remainder of the sheared portions inwardly of the corners so as to form uniform welding projections around said pilot at the outer corners of the nut, the said ends of said welding projections being disposed in a common plane which is axially spaced from the plane of said side, said sheared portions at the corners being spaced apart so as to leave portions of the original flat edges of the nut intact.

5. A discrete weld nut formed from flat square stock having corner portions partly sheared from the undistorted remainder of the stock downwardly from one side thereof, the sheared corner portions being spaced apart to provide portions of the original flat edges of the nut intact, the sheared corner portions being formed downwardly below the said one side of the nut and having the upper surface thereof inclined upwardly and outwardly to leave the sheared portions at the corners of the nut at a higher elevation than the remainder of the upper surface of the sheared portions so as to form welding projections, said welding projections being disposed at the outermost corners of the nut, the tops of said welding projections consisting of deformed metal and being disposed in a common plane normal to the axis of the nut.

6. A method of forming a discrete pilot weld element by a single application of pressure from a polygonal sided blank having generally parallel end surfaces of equal area intersecting generally flat sides in lateral edges with the flat sides intersecting each other in continuous axial edges, the sides and end surfaces forming corners at the outermost periphery of said blank, and connecting means axially disposed centrally of the blank; the method including the steps of supporting the blank by either one of its end surfaces while dissociated from the part to which the weld element is to be welded and while so supported; directing axial pressure of metal deforming intensity in three stages and pressure areas against the other of its end surfaces, the first area being annular, the first and second pressure areas being applied within the corners of the blank and spaced radially outward from the connecting means and the third pressure area being applied to such corners; continuing the application of such axial pressure to displace the material of the blank including such corners axially in the direction in which such pressure is applied and laterally while allowing only limited predetermined lateral flow of the flat sides at the corners adjacent said other surface; and discontinuing such axial pressure when the first pressure area has formed a central pilot surrounded by an annular surface which intersects the sides of the blank between the corners a substantial distance axially removed from the original plane of said other end surface; when the second pressure area has formed a sloping surface at each corner rising from the said annular surface and generally facing the pilot so that the corners of the blank form axially extending uniform projections at the outer corners of the nut rising above said annular surface and spaced from said pilot; and when the third pressure area has deformed and axially displaced the tips of such projections so that they lie in a common plane between the end surfaces generally perpendicular to the axis, all while maintaining the axial dimension of the weld element through the pilot and the connecting means the same as the original axial dimension of the blank, and the overall dimensions and shape of such weld element within limits such that the discrete weld element produced is of a size and shape suitable for use in hopper feed equipment.

7. A method of forming a discrete pilot weld nut by a single application of pressure from a standard nut blank of uniform thickness axially having corners at the outermost periphery of the blank and a central axially extending bore, such method including the steps of applying axial pressure of metal deforming intensity at areas on one end of the blank spaced outwardly from the bore while the blank is dissociated from the part to which the weld nut is to be welded, increasing the area of applied pressure outwardly toward and including such corners at said one end so as to displace such end corners of the blank at such areas only axially in the direction in which such pressure is applied and laterally outwardly, confining the lateral displacement at said one end to preselected dimensions while maintaining a zone surrounding and including the bore of the nut blank free from metal deforming pressure and from metal displacement, and discontinuing such pressure when the corners are formed as uniform welding projections at the outer corners of the nut with their tips surrounding a central pilot and lying in a common plane parallel to and between the original end faces of the blank and at the outermost periphery thereof, all while maintaining the overall axial dimension of the pilot nut within the original axial dimension of the blank, and the overall dimensions and shape of such weld element within limits such that the discrete weld element produced is of a size and shape suitable for use in hopper feed equipment.

8. The method of claim 7 in which die pressure is applied to the tips of the projections to blunt them.

9. The mehod of forming a discrete pilot weld nut, by a single application of pressure, from an initially polygonal sided blank having end surfaces of equal area and corners at the outermost periphery of said blank and an axial bore, which includes the following steps: supporting either one of such end surfaces against axial displacement while the blank is dissociated from the part to which the weld nut is to be welded and while so supported; directing single unitary pressure of metal deforming intensity axially against the other end surface and its corners of the blank, in a circumferential zone of pressure located within and including the corners of the blank and around and radially outwardly of the bore, while allowing preselected lateral flow of the material at the corners at said other end surface outwardly beyond the outermost periphery of the original body contour of the blank; directing and limiting such axial pressure to form axially extending uniform corner welding projections at the outer corners of the nut having outer tips lying in a predetermined plane at the outermost periphery of said blank, closer to the original surface against which the pressure is directed than is a plane common to the inner portions of the corner projections, and with both said planes generally perpendicular to the axis ofthe pilot weld nut; continuing the application of axial pressure until both said last-mentioned planes lie between the planes of the end surfaces of the blank, while maintaining an inner part of that end surface against which the axial pressure was directed free from such pressure in a zone surrounding and including the bore, and at substantially its original distance from the supported end surface of the original blank; and confining and discontinuing the application of axial pressure before metal flow distorts the central bore, all while maintaining the overall axial dimension of the pilot weld nut within the original axial dimension of the blank, and the overall dimensions and shape of such weld element within limits such that the discrete weld element produced is of a size and shape suitable for use in hopper feed equipment.

10. A method of forming a discrete pilot weld nut from a standard square nut blank having corners and a threaded axial bore which includes the steps of applying axial pressure of metal deforming intensity at areas on one end of the blank spaced outwardly from said bore while the blank is dissociated from the part to which the weld nut is to be welded, increasing the area of applied pressure outwardly toward and including the corners so as to displace the material at such end and the corners thereof both axially and laterally outwardly while maintaining the axial dimension of said blank through the portion thereof which forms said bore, confining the lateral displacement to preselected dimensions, and discontinuing the pressure when the corners are formed into uniform axial welding projections at the outer periphery of the blank with their tips surrounding a central pilot and lying in a common plane parallel to and between the original end faces of the blank, all while maintaining the discrete weld element produced of a size and shape within limits suitable for use in hopper feed equipment.

11. The method of forming a square discrete pilot weld nut with connecting means axially disposed centrally thereof from a blank of uniform axial thickness having parallel end surfaces of equal area intersecting a continuous peripheral surface which extends continuously axially between such end surfaces and is disposed normal thereto and forms lateral edges therewith, such method including the steps of: supporting the blank by itself while dissociated from the part to which the weld nut is to be welded and while so supported; directing axial pressure of metal deforming intensity against one of such end surfaces of the blank, in a zone of pressure which includes all of such end surface to and including the outermost periphery of the blank except a central part located around and adjacent the axis of said blank thereby to form an annular, generally flat surface which intersects the sides of the blank, while allowing preselected lateral flow of the material of the blank at the sides thereof outwardly beyond the original body contour of the blank and a central pilot projecting upwardly from and surrounded by said annular surface; directing and limiting such axial pressure to form uniform welding projections at the outer corners of said nut having their tips lying in a predetermined plane, closer to the original surface against which the pressure is directed than is the plane of said flat surface, and with both said planes generally perpendicular to the axis of the weld nut; and continuing the application of such axial pressure until said last-mentioned planes lie between the planes of the original end surfaces of the blank, all while maintaining the overall axial dimensions of the pilot nut within the original axial dmension of the blank and the overall dimensions and shape of such weld nut within such limits that the discrete weld nut produced is of a size and shape suitable for use in hopper feed equipment.

12. A method of forming a discrete pilot weld nut from a discrete nut blank having corners at the outer periphery thereof and a threaded axial bore which includes the steps of applying axial pressure of metal deforming intensity to areas on either end of the blank spaced outwardly from said bore while the blank is dissociated from the part to which the weld nut is to be welded, increasing the area of applied pressure outwardly toward and including such corners at the outer periphery of the blank so as to displace the corners at such end axially while maintaining the axial dimension of said blank through the portion thereof which forms said bore to form a central pilot including such bore, and discontinuing such pressure when the corners are formed into uniform axial welding projections at the outer periphery of the pilot end of the blank projecting from the blank in the same direction as the pilot and with the tops of such projections surrounding such pilot and lying in a common plane parallel to and between the original end faces of the blank and normal to the axis of said bore, all while controlling the lateral flow of the material of the blank at the sides thereof so as to maintain the discrete weld element produced of a size and shape approximating that of the blank and within limits suitable for use in hopper feed equipment, said method being characterized in that said welding projections are simultaneously so formed in one continuous operation and uniformly disposed with respect to an undistorted flat reference surface of the blank.

13. The method of forming a polygonal discrete pilot weld element from a discrete blank of uniform axial thickness having parallel end surfaces of equal area intersecting a continuous peripheral surface which extends continuously axially between such end surfaces and is disposed normal thereto and forms lateral edges therewith, such method including the steps of: supporting the blank by itself while dissociated from the part to which the weld element is to be welded and while so supported; directing axial pressure of metal deforming intensity symmetrically against either of said end surfaces of the blank, in a zone of pressure which includes all of such end surface to and including the outermost periphery of the blank except a central part located around and adjacent the axis of said blank thereby to form a central pilot projecting from and surrounded by an annularly extending surface which intersects the sides forming the outer periphery of said blank; directing and limiting such axial pressure to simultaneously form uniform welding projections extending in the same direction as and surrounding said pilot and disposed at the corners at the outer periphery of said element, and with the ends of such projections lying in a common plane, closer to the original surface against which the pressure is directed than is the plane of said annularly extending surface, and with both of said planes generally perpendicular to the axis of said pilot; and continuing the application of such axial pressure until said last-mentioned planes lie between the planes of the original end surfaces of the blank, all while maintaining the overall axial dimensions of the pilot element within the original axial dimension of the blank and restraining the lateral flow of the material of the blank at the sides thereof so as to maintain the overall dimensions and shape of such weld element within such limits that the discrete weld element produced is of a size and shape suitable for use in hopper feed equipment.

14. That method of forming a polygonal discrete pilot weld nut from a discrete blank having parallel end surfaces of equal area intersecting a continuous peripheral surface which extends continuously axially between such end surfaces and is normal thereto and forms lateral edges therewith, such method including the steps of: supporting the blank by itself while dissociated from the part to which the weld nut is to be welded and while so supported directing axial pressure of metal deforming intensity symmetrically against either of said end surfaces in a plurality of pressure zones so as to axially displace metal of the blank at the periphery downwardly relative to a central part of the blank thereby to form a central pilot, applying radial outward pressure to portions of the axially displaced metal while applying said axial pressure, directing and limiting such axial and radial pressure to simultaneously form uniform welding projections extending in the same direction as and surrounding said pilot and disposed at the corners at the outer periphery of said weld nut, and with the tips of said projections lying in a common plane axially below the end face of said pilot; all while maintaining the overall axial dimension of the pilot weld nut within the original axial dimension of the blank and restraining the lateral flow of the material of the blank at the sides thereof so as to maintain the overall dimensions and shape of such weld nut produced within limits such that it is of a size and shape suitable for use in hopper feed equipment.

15. That method of forming a discrete polygonal pilot weld nut from a discrete blank having parallel end surfaces of equal area intersecting a continuous pehipheral surface which extends continuously axially between such end surfaces and is disposed normal thereto and forms lateral edges therewith, said method including the steps of: supporting the discrete blank by either one of its end surfaces while dissociated from the part to which the resulting weld nut is to be welded and while so supported; directing axial pressure of metal deforming intensity in a series of stages and pressure areas against the other of its end surfaces, said pressure areas being symmetrically disposed, applying such pressure to displace the material of the blank subjected to such pressure areas only in the direction in which such pressure is applied and laterally outwardly while limiting such lateral flow and discontinuing such axial pressure when one of said pressure areas has formed a central pilot surrounded by an annular surface which intersects the sides of the weld nut between the corners thereof a substantial distance axially removed from the plane of the end face of said pilot, when a second pressure area has formed at each corner of the weld nut an axially extending uniform projection rising from said annular surface and spaced from the pilot and with the tips of said projections lying in a common plane between the end surfaces of the nut and generally perpendicular to the axis thereof, all while maintaining the axial dimension of the weld nut through the pilot within the original axial dimension of the blank and the overall dimensions and shape of such weld nut within limits such that it is of a size and shape suitable for use in hopper feed equipment.

References Cited in the file of this patent

UNITED STATES PATENTS

| | | |
|---|---|---|
| 2,054,187 | Almdale | Sept. 15, 1936 |
| 2,110,039 | Double | Mar. 1, 1938 |
| 2,612,647 | Howe | Oct. 7, 1952 |
| 2,652,942 | Muchy | Sept. 22, 1953 |

UNITED STATES PATENT OFFICE

CERTIFICATE OF CORRECTION

Patent No. 3,045,736                        July 24, 1962

Earl E. Howe

It is hereby certified that error appears in the above numbered patent requiring correction and that the said Letters Patent should read as corrected below.

Column 7, line 15, after "form" insert -- uniform --.

Signed and sealed this 30th day of October 1962.

(SEAL)
Attest:

ERNEST W. SWIDER
Attesting Officer

DAVID L. LADD
Commissioner of Patents